(12) United States Patent
Jones et al.

(10) Patent No.: US 8,159,608 B2
(45) Date of Patent: Apr. 17, 2012

(54) SYSTEM AND METHOD FOR DETECTING CLOSED CAPTIONING DATA IN AN INTERNET PROTOCOL TELEVISION SYSTEM

(75) Inventors: Todd W. Jones, Kansas City, MO (US); Douglas Medina, Grain Valley, MO (US); Frank Mitchals, Willard, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 389 days.

(21) Appl. No.: 12/624,108

(22) Filed: Nov. 23, 2009

(65) Prior Publication Data

US 2011/0122316 A1    May 26, 2011

(51) Int. Cl.
*H04N 7/00* (2006.01)
*H04N 11/00* (2006.01)
*H04N 5/278* (2006.01)

(52) U.S. Cl. ........................... 348/468; 348/465

(58) Field of Classification Search .................. 348/468, 348/465, 466, 467, 563, 589, 600; 704/235, 704/260, 251, 201, 211; *H04N 7/00, 11/00, H04N 5/445, 9/74, 9/76, 5/278*
See application file for complete search history.

(56) References Cited

U.S. PATENT DOCUMENTS

| | | | |
|---|---|---|---|
| 5,596,375 | A  | 1/1997  | Kwon |
| 5,619,275 | A  | 4/1997  | Tults |
| 6,637,032 | B1 | 10/2003 | Feinleib |
| 7,229,183 | B2 | 6/2007  | Golle et al. |
| 7,421,723 | B2 | 9/2008  | Harkness et al. |
| 2002/0059633 | A1 | 5/2002 | Harkness et al. |
| 2005/0060145 | A1 | 3/2005 | Abe et al. |
| 2007/0285566 | A1 | 12/2007 | Lee |

*Primary Examiner* — Sherrie Hsia
(74) *Attorney, Agent, or Firm* — Guntin Meles & Gust, PLC; Ed Guntin

(57) ABSTRACT

A closed caption detection system includes a video line selector that outputs a selected line of a video signal, a luminance detector that outputs a luminance level of the selected line, and an alarm that compares the luminance level with a threshold level and provides an alarm based on the result. A method of detecting closed captioning data includes selecting a television channel, decoding closed captioning in the channel, detecting a luminance level of a closed captioning line of the television signal, comparing the luminance level with a threshold level, waiting for a time if luminance level of the selected line is less than the threshold luminance level, and then re-detecting luminance level and re-comparing the luminance levels, then, if the luminance level is less than the threshold level, indicating the absence of closed captioning data.

20 Claims, 4 Drawing Sheets

SYSTEM AND METHOD FOR DETECTING CLOSED CAPTIONING DATA IN AN INTERNET PROTOCOL TELEVISION SYSTEM

FIELD OF THE DISCLOSURE

The present disclosure generally relates to an Internet protocol television system, and more particularly relates to detecting closed captioning data in an Internet protocol television system.

BACKGROUND

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can also record audio or video content for storage in a digital format on the user's set-top box or on a data server on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
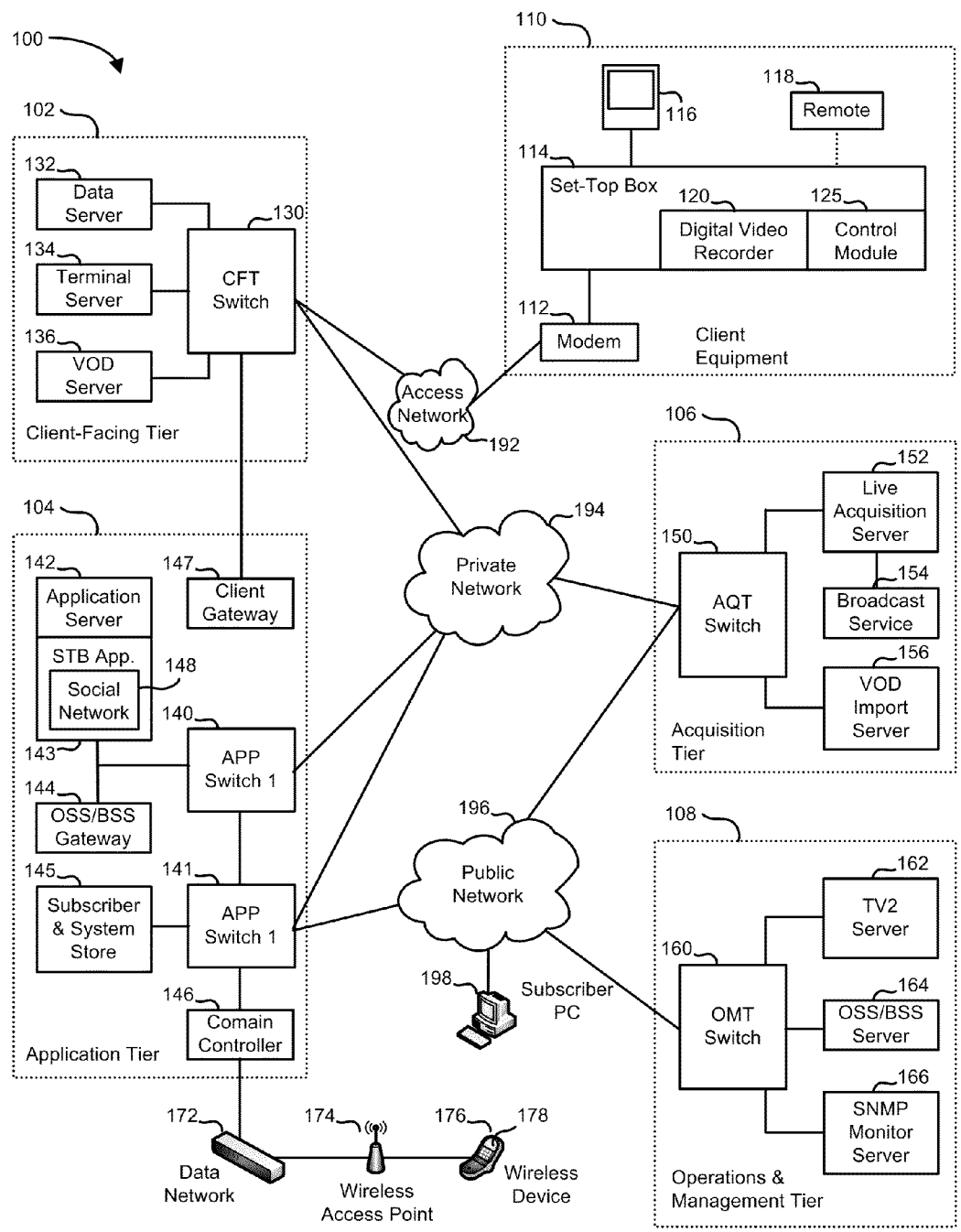
FIG. 1 is a block diagram illustrating an embodiment of an IPTV network.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Acquisition tier 106 includes an acquisition tier (AQT) switch 150, a live acquisition server 152, a broadcast service 154, and a VOD importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

Content received by live acquisition server 152, broadcast service 156, VOD import server 156, and TV2 Server 162 can include content transmitted by analog and digital signal formats. In order to send content over IPTV system 100, the analog signal is converted to a digital format and the converted digital content is packetized into Internet protocol packets for transmission over IPTV system 100. In a particular embodiment, analog content that is received by acquisition tier 106 is converted to the digital format in AQT switch 150. In another embodiment, analog content that is received by live acquisition server 152, broadcast service 156, or VOD import server 156 can be converted to the digital format before the content is sent to AQT switch 150. Similarly, analog content received by TV2 server 162 can be converted to the digital format before the content is sent to OMT switch 160, or can be converted to the digital format by OMT switch 160.

Analog content can include closed captioning (CC) data encoded in line 21 of the vertical blanking interval (VBI) of the analog signal. CC data is decoded and the text encoded therein is superimposed onto the image of the content item displayed on the client's display device 116. The decoded CC data is displayed using luminance for the text against a dark background. For example, the text from the CC data can appear as white letters against a black background. The text provides a readable transcript of the words spoken or sung in the content, a description of sounds in the content, or other text that assists in describing the content. CC data can be encoded onto line 21 in accordance with the Electronic Industries Alliance EIA-608 standard for closed captioning for TV broadcasts in the United States and Canada.

Figure 2:
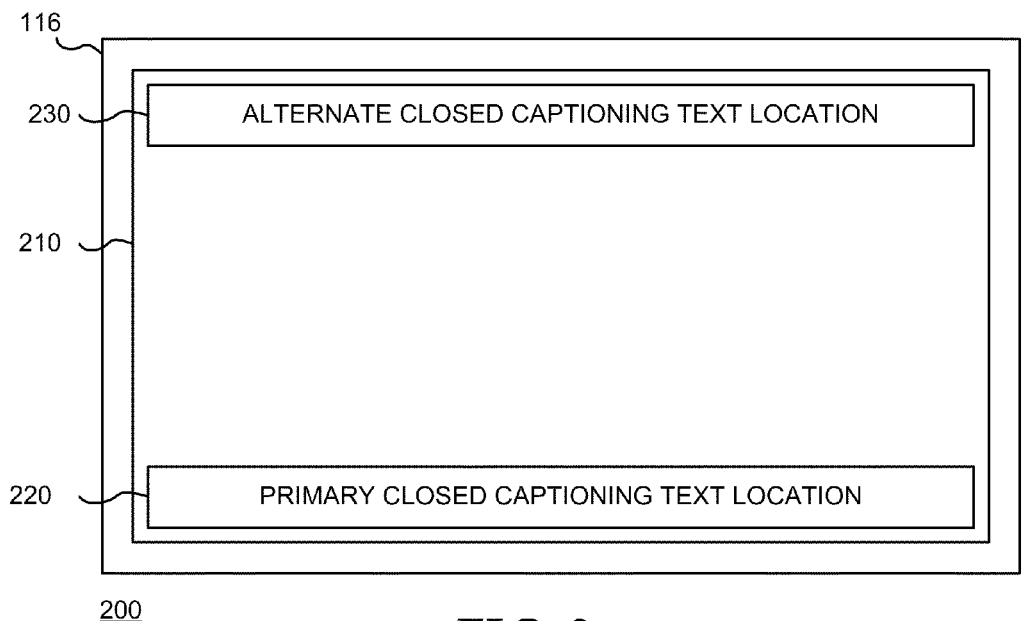
FIG. 2 is an illustration of an embodiment of a screen displayed on a display device that includes closed captioning viewing areas.

FIG. 2 illustrates an embodiment of a screen 200 displayed on display device 116, and includes a viewing area 210, a primary CC area 220, and an optional alternate CC area 230. Viewing area 210 represents the image of the content being shown on display device 116. For example, viewing area 210 can include the video of a content item, television guide information, display screens generated by IPTV system 100, other visual content, or a combination thereof. Primary CC area 220 provides a running text of the CC data encoded in the analog signal that describes the content. Typically, a CC decoder similar to CC/Line 21 decoder 320 in FIG. 3, as described below, decodes the CC data in display device 116 and the decoded text is overlaid on the bottom of viewing area 210 in primary CC area 220 and appears as white text against a black background. In an optional embodiment, the decoded text is overlaid on the top of viewing area 210 in alternate CC area 230.

Figure 3:
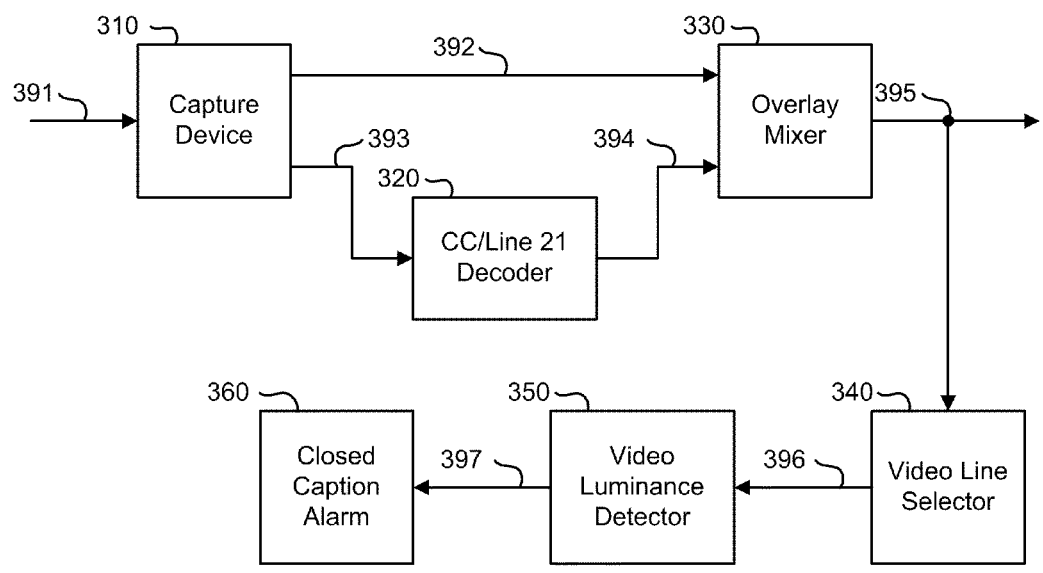
FIG. 3 is a block diagram of a closed captioning data detector according to an embodiment of the present disclosure.

In a particular embodiment, the operator of IPTV system 100 inspects analog signals received by live acquisition server 152, broadcast service 156, VOD import server 156, and TV2 Server 162 before converting the signals to a digital format, in order to determine if the CC data is being correctly received. FIG. 3 illustrates an embodiment of a CC data detector 300, including a capture device 310, a CC/line 21 decoder 320, an overlay mixer 330, a video line selector 340, a video luminance detector 350 and a closed caption alarm 360. Capture device 310 has an input connected to a signal source (not illustrated), a first output, and a second output. CC/line 21 decoder 320 has an input connected to the second output of capture device 310 and an output. Overlay mixer 330 has a first input connected to the first output of capture device 310, a second input connected to the output of CC/line 21 decoder 320, and an output. Video line selector 340 has an input connected to the output of overlay mixer 330 and an output. Video luminance detector 350 has an input connected to the output of video line selector 340 and an output. Closed caption alarm 360 has an input connected to the output of video luminance detector 350.

Capture device 310 receives an analog television signal 391 at the input. An example of an analog television signal includes a National Television System Committee (NTSC) signal. Capture device 310 outputs the video content 392 on the first output, and the VBI content 393 component of analog television signal 391 on the second output. CC/line 21 decoder 320 receives VBI content 393, decodes the CC data encoded on line 21 and outputs CC text content 394. Overlay mixer 330 receives video content 392 and CC text content 394, and combines them into a captioned video content 395. Captioned video content 395 can be output to a converter (not illustrated) that converts the captioned video content from an analog signal into a digital format suitable for communication on IPTV system 100. Captioned video content 395 can provide a screen image similar to screen 200, with the text content appearing in a primary text location or an alternate text location similar to primary CC area 220 and alternate CC area 230, respectively.

Video line selector 340 receives captioned video content 395, selects the portions of captioned video content 395 that include the text content associated with the CC data, and outputs the selected video content 396. For example, in an NTSC television signal, the primary text location may be in horizontal scan lines 450 to 480, and the alternate text location may be in horizontal scan lines 10 to 30. Thus, video line selector 340 can select horizontal scan lines 10-30 and 450-480 to output as selected video content 396. Video luminance detector 350 receives selected video content 397, determines the luminance level of selected video signal 397, and outputs a luminance level 397. In another embodiment, video line selector 340 selects horizontal scan lines for closed captioning of high-definition (HD) content, such as HD-720p content, HD-1080p content, another HD standard content, or a combination of HD and standard definition (SD) content.

Closed caption alarm 360 receives luminance level 397 and compares the luminance level with a pre-determined threshold luminance level. If luminance level 397 is at or above the pre-determined threshold luminance level, then closed caption alarm 360 determines that the CC data is being correctly processed, and no alarm is given. If luminance level 397 is less than the pre-determined threshold luminance level, then closed caption alarm 360 determines that the CC data is not being correctly processed, and the closed caption alarm generates an alarm. For example, the operator of IPTV system 100 can determine that a luminance level of less than eighty-five percent is indicative of loss of CC data, and that a luminance level at or above eighty-five percent is consistent with the presence of CC data. Thus the pre-determined threshold luminance level can be set to 85%. In another embodiment, if luminance level 397 is greater than the pre-determined threshold luminance level, then closed caption alarm 360 determines that the CC data is being correctly processed, and no alarm is given. If luminance level 397 is less than or equal to the pre-determined threshold luminance level, then closed caption alarm 360 determines that the CC data is not being correctly processed, and closed caption alarm 360 gives an alarm. Closed caption alarm 360 provides an indicator to the operator of IPTV system 100 that there is a problem with the CC data on the particular channel, and can allocate resources to resolve the problem.

Figure 4:
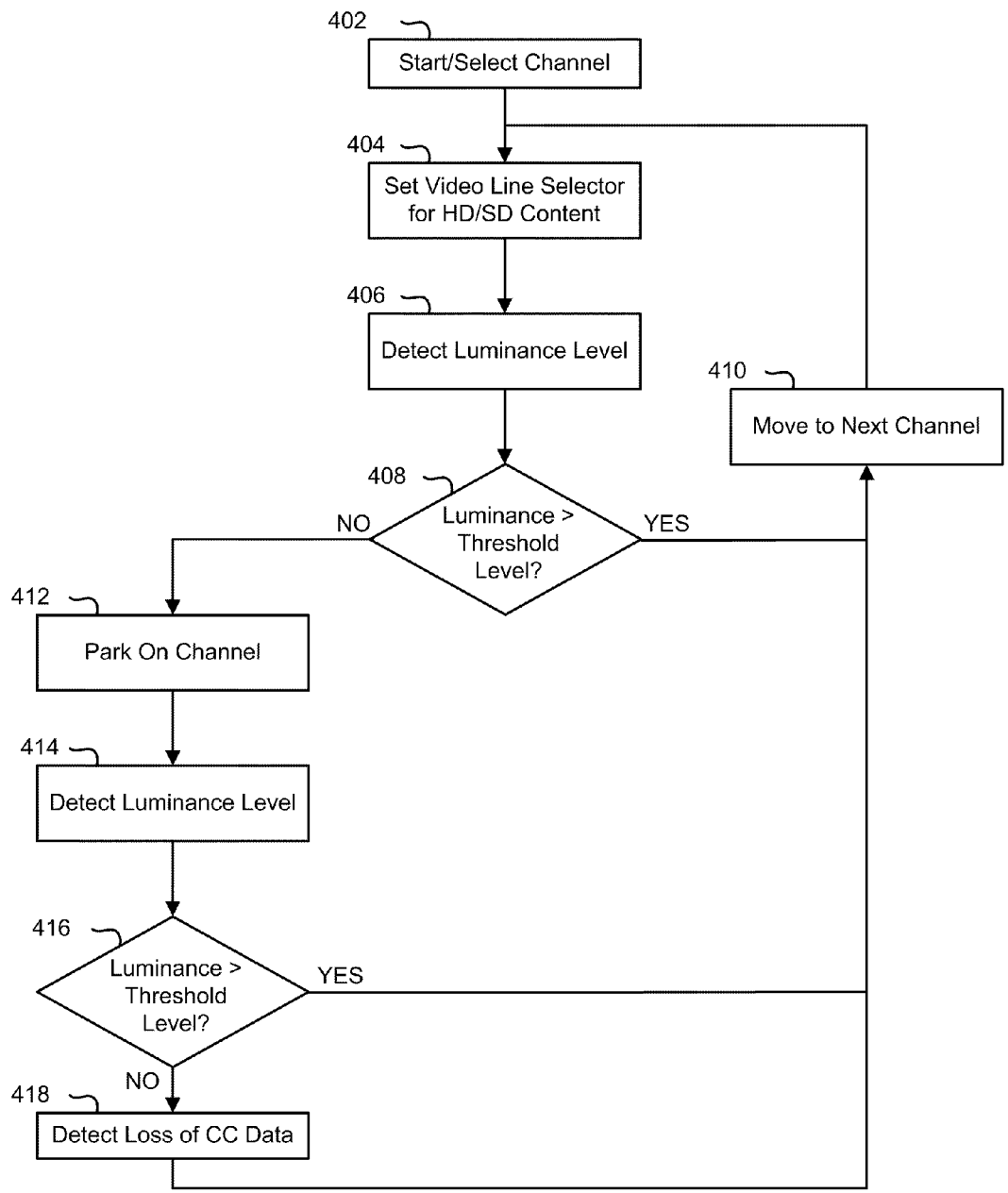
FIG. 4 is a flowchart illustrating an embodiment of a method of detecting closed captioning in an Internet protocol television system.

FIG. 4 is a flowchart illustrating an embodiment of a method of detecting closed captioning in an IPTV system. The method starts in block 402, where a channel of content is selected. For example, the closed captioning detection can begin with the lowest channel. A video line selector is set to select the appropriate lines for closed captioning in HD content or SD content, depending on content stream of the selected channel in block 404. Thus, if the lowest channel is an SD channel, then video line selector 340 can be set to select lines 10-30 and 450-480 to output as selected video content. The luminance of the selected lines is detected in block 406. Here, the luminance of lines 10-30 and 450-480 can be detected by video luminance detector 350. A decision is made as to whether or not the detected luminance level is greater than a threshold luminance level in decision block 408. In another embodiment (not illustrated), the decision is whether or not the detected luminance level is greater than, or equal to the threshold luminance level. If the detected luminance level is greater than the threshold luminance level, the "YES" branch of decision block 408 is taken, a next channel is selected in block 401, and processing returns to block 404, where the video line selector is set to select the appropriate lines for closed captioning in HD content or SD content, depending on content stream of the newly selected channel.

If the detected luminance level is not greater than the threshold luminance level, the "NO" branch of decision block 408 is taken, the detection system is parked on the selected channel for a pre-determined length of time in block 412. For example, a low luminance level may be attributable to a factor other than problems with the CC data, and so the detection system can remain on the selected channel for the pre-determined length of time to ensure that there is a problem with the CC data. Thus, a non-limiting example of the pre-determined length of time includes 1 minute, 5 minutes, 10 minutes, or another pre-determined length of time. The luminance of the selected lines is detected for the pre-determined length of time in block 414. A decision is made as to whether or not the detected luminance level is greater than a threshold luminance level in decision block 416. If so, the "YES" branch of decision block 416 is taken, and processing returns to block 410, where a next channel is selected. If the detected luminance level is not greater than the threshold luminance level, the "NO" branch of decision block 416 is taken, a loss of CC data is detected in block 418, and processing returns to block 410, where a next channel is selected.

Figure 5:
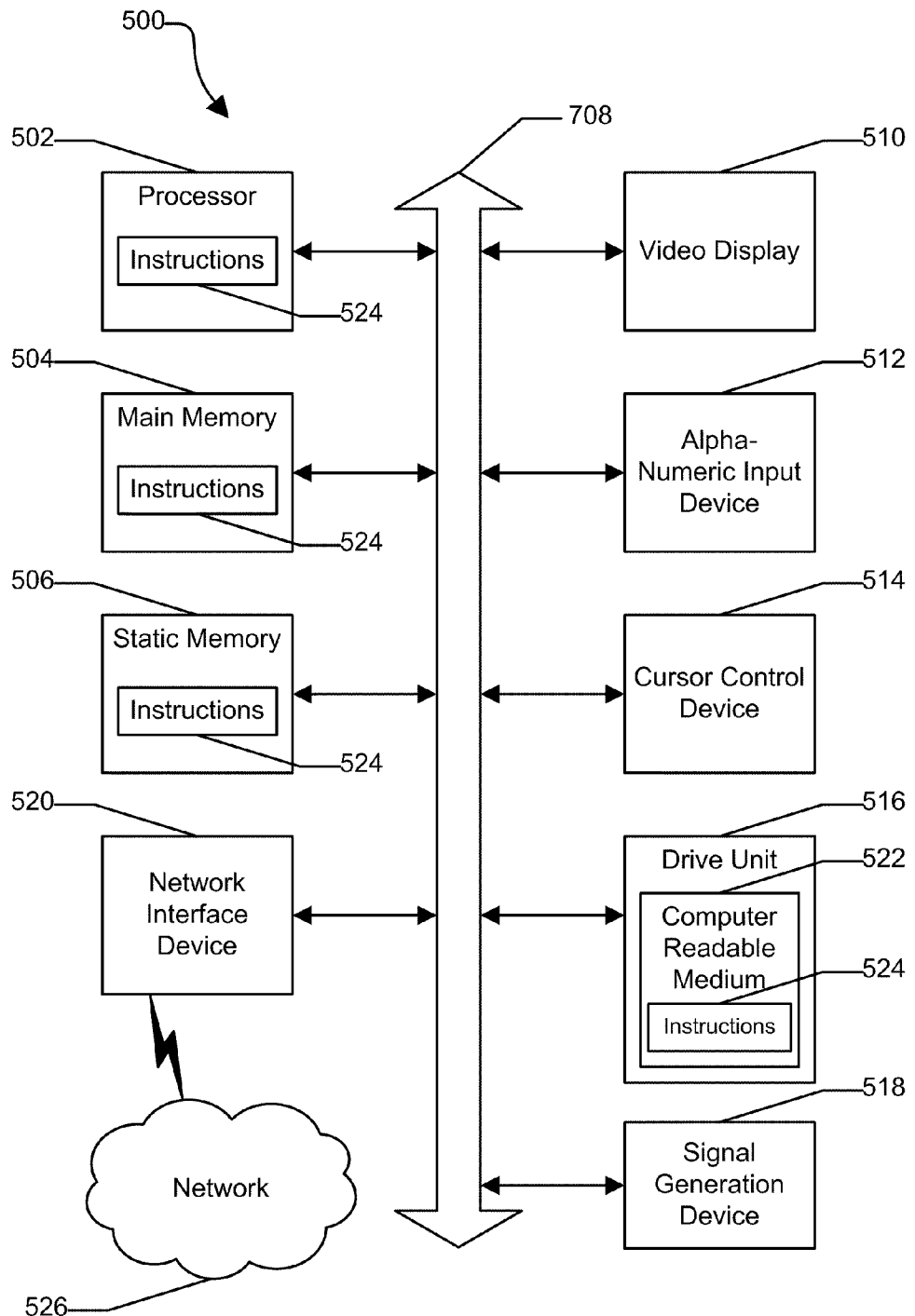
FIG. 5 is a block diagram showing an illustrative embodiment of a general computer system.

FIG. 5 shows an illustrative embodiment of a general computer system 500 in accordance with at least one embodiment of the present disclosure. Computer system 500 includes a set of instructions that can be executed to cause computer system 500 to perform any one or more of the methods or computer based functions disclosed herein. Computer system 500 can operate as a standalone device or can be connected via a network to other computer systems or peripheral devices.

In a networked deployment, computer system 500 operates in the capacity of a server or as a client computer in a server-client network environment, or as a peer computer system in a peer-to-peer (or distributed) network environment. Computer system 500 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 500 is implemented using electronic devices that provide voice, video or data communication. Further, while computer system 500 is illustrated as a single system, the term "system" shall also be taken to include any collection of systems or sub-systems that individually or jointly execute a set, or multiple sets, of instructions to perform one or more computer functions.

Computer system 500 includes a processor 502 such as a central processing unit (CPU), a graphics processing unit (GPU), or both. Moreover, computer system 500 includes a main memory 504 and a static memory 506 that communicate with each other via a bus 508. Computer system 500 further includes a video display unit 510, such as a liquid crystal display (LCD), an organic light emitting diode (OLED), a flat panel display, a solid state display, or a cathode ray tube (CRT). Additionally, computer system 500 includes an input device 512, such as a keyboard, and a cursor control device 514, such as a mouse. Computer system 500 also includes a disk drive unit 516, a signal generation device 518, such as a speaker or remote control, and a network interface device 520.

In a particular embodiment, disk drive unit 516 includes a computer-readable medium 522 in which one or more sets of instructions 524 are embedded. Instructions 524 embody one or more of the methods or logic as described herein. In a particular embodiment, instructions 524 reside completely, or at least partially, within main memory 504, static memory 506, and/or within processor 502 during execution by computer system 500. Main memory 504 and processor 502 also include computer-readable media. Network interface device 520 provides connectivity to a network 526 such as a wide area network (WAN), a local area network (LAN), or other network. The present disclosure contemplates a computer-readable medium that includes instructions 524 or receives and executes instructions 524 responsive to a propagated signal, so that a device connected to network 526 can communicate voice, video or data over network 526. Further, instructions 524 can be transmitted or received by network 526 via network interface device 520.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, or hardware implementations, or a combination thereof.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A closed caption detection system, comprising:
   a video line selector having a first terminal for receiving a video signal, and a second terminal, wherein the video line selector is operable to output a selected line of the video signal on the second terminal;
   a luminance detector having a first terminal coupled to the second terminal of the video line selector, and a second terminal, wherein the luminance detector is operable to output a luminance level of the selected line of the video signal on the second terminal; and
   an alarm having a first terminal coupled to the second terminal of the luminance detector, and operable to:
      compare the luminance level of the selected line of the video signal with a threshold luminance level; and
      provide an alarm based on the result of the comparison.

2. The closed caption detection system of claim 1, wherein the selected line of the video signal includes a closed captioning text line of the video signal.

3. The closed caption detection system of claim 2, wherein the video signal includes a standard definition television signal.

4. The closed caption detection system of claim 2, wherein the video signal includes a high definition television signal.

5. The closed caption detection system of claim 1, wherein the alarm is provided when the luminance level of the selected line of the video signal is less than the threshold luminance level.

6. The closed caption detection system of claim 5, wherein the threshold level is selected to be eighty-five percent luminance.

7. The closed caption detection system of claim 1, wherein the alarm is provided when the luminance level of the selected line of the video signal is less than or equal to the threshold luminance level.

8. The closed caption detection system of claim 1, wherein the video signal includes a selected channel of a plurality of television channels.

9. A method of detecting closed captioning data, comprising:
   receiving a television signal;
   decoding with a closed captioning decoder closed captioning data in the television signal to provide an image signal that includes television content and closed captioning content;
   selecting with a video line selector a line of the image signal that includes the closed captioning content;
   detecting with a luminance detector a luminance level of the selected line; and
   comparing the luminance level of the selected line of the image signal with a threshold luminance level.

10. The method of claim 9, wherein the television signal includes a standard definition television signal.

11. The method of claim 9, wherein the television signal includes a high definition television signal.

12. The method of claim 9, further comprising providing an alarm when the luminance level of the selected line of the image signal is less than the threshold luminance level.

13. The method of claim 12, wherein the threshold level is selected to be eighty-five percent luminance.

14. The method of claim 9, further comprising providing an alarm when the luminance level of the selected line of the image signal is less than or equal to the threshold luminance level.

15. The method of claim 9, wherein the television signal includes a selected channel of a plurality of television channels.

16. A method of detecting closed captioning data, comprising:
  selecting a first television channel;
  decoding with a closed captioning decoder closed captioning data in the first television signal;
  detecting with a luminance detector a luminance level of a first selected line of the first television signal, wherein the first selected line is selected based upon the expectation that the first selected line includes closed captioning data;
  comparing the luminance level of the first selected line of the first television signal with a threshold luminance level;
  in response to the luminance level of the first selected line being less than the threshold luminance level, waiting a predetermined amount of time;
  after the predetermined amount of time, re-detecting with the luminance detector the luminance level of the first selected line of the first television signal;
  after re-detecting the luminance level, re-comparing the luminance level of the first selected line of the first television signal with the threshold luminance level; and
  in response to the luminance level of the first selected signal being less than the threshold luminance level after re-detecting the luminance level, providing an alarm indication to indicate the absence of closed captioning data.

17. The method of claim 16, further comprising:
  in response to the luminance level of the selected line being greater than the threshold luminance level, selecting a second television channel;
  decoding with the closed captioning decoder closed captioning data in the second television signal;
  detecting with the luminance detector a luminance level of a second selected line of the second television signal, wherein the second selected line is selected based upon the expectation that the second selected line includes closed captioning data; and
  comparing the luminance level of the second selected line of the second television signal with a threshold luminance level.

18. The method of claim 17, further comprising:
  in response to the luminance level of the first selected signal being greater than the threshold luminance level after re-detecting the luminance level, selecting a second television channel;
  decoding with the closed captioning decoder closed captioning data in the second television signal;
  detecting with the luminance detector a luminance level of a second selected line of the second television signal, wherein the second selected line is selected based upon the expectation that the second selected line includes closed captioning data; and
  comparing the luminance level of the second selected line of the second television signal with a threshold luminance level.

19. The method of claim 16, wherein the threshold level is selected to be eighty-five percent luminance.

20. The method of claim 16, wherein the first television signal includes a high definition television signal.

* * * * *